US011879266B2

(12) United States Patent
Taylor et al.

(10) Patent No.: US 11,879,266 B2
(45) Date of Patent: Jan. 23, 2024

(54) AUXILIARY TRIM LOCKING MODULE

(71) Applicant: Schlage Lock Company LLC, Carmel, IN (US)

(72) Inventors: Nathanael Taylor, Colorado Springs, CO (US); Paul J. Meisel, Peyton, CO (US); Drake Lunday, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 367 days.

(21) Appl. No.: 16/665,462

(22) Filed: Oct. 28, 2019

(65) Prior Publication Data

US 2021/0123266 A1 Apr. 29, 2021

(51) Int. Cl.
*E05B 13/00* (2006.01)
*E05B 65/00* (2006.01)

(52) U.S. Cl.
CPC ........ *E05B 13/002* (2013.01); *E05B 65/0014* (2013.01)

(58) Field of Classification Search
CPC ...... E05C 19/003; E05C 1/10; E05B 65/1093; E05B 13/002; E05B 65/0014; E05Y 2900/132; E05Y 16/88556
See application file for complete search history.

(56) References Cited

U.S. PATENT DOCUMENTS

| | | | | |
|---|---|---|---|---|
| 4,884,834 | A * | 12/1989 | Ozagir | E05B 1/0015 292/350 |
| 5,927,769 | A * | 7/1999 | Pullen | E05C 1/16 292/169.13 |
| 6,179,352 | B1 | 1/2001 | Schneeberger | |
| 6,568,231 | B1 * | 5/2003 | Huang | E05B 13/004 70/489 |
| 6,929,292 | B1 | 8/2005 | Galindo et al. | |
| 7,334,824 | B2 | 2/2008 | Sundberg et al. | |
| 8,100,443 | B2 | 1/2012 | Talpe | |
| 8,177,268 | B2 | 5/2012 | Varney et al. | |
| 9,834,956 | B2 | 12/2017 | Hogan | |

(Continued)

FOREIGN PATENT DOCUMENTS

| | | | |
|---|---|---|---|
| EP | 3106591 | A1 | 12/2016 |
| WO | 2002014634 | A1 | 2/2002 |

(Continued)

*Primary Examiner* — Kristina R Fulton
*Assistant Examiner* — Thomas L Neubauer
(74) *Attorney, Agent, or Firm* — Taft Stettinius & Hollister LLP

(57) ABSTRACT

An exemplary auxiliary trim locking module is configured for use with a handle including a shank. The handle is mounted for rotation relative to a rose having an aperture defined therein. The auxiliary trim locking module includes a collar defining an opening sized and shaped to receive the shank, a blocking member movably mounted to the collar for movement between a proximal position and a distal position, and a biasing mechanism urging the locking member toward the distal position. The blocking member includes a projection sized and shaped to be received in the aperture, and an arm operable to be manually engaged by a user to shift the blocking member between a proximal position and a distal position.

23 Claims, 7 Drawing Sheets

(56) References Cited

U.S. PATENT DOCUMENTS

| | | | | |
|---|---|---|---|---|
| 2015/0107314 | A1* | 4/2015 | Le | E05B 13/002 70/209 |
| 2018/0051485 | A1 | 2/2018 | Picard et al. | |
| 2018/0209169 | A1 | 7/2018 | Cohen et al. | |

FOREIGN PATENT DOCUMENTS

| | | | | |
|---|---|---|---|---|
| WO | 2018076052 | A1 | 5/2018 | |
| WO | 2018106739 | A1 | 6/2018 | |
| WO | WO-2018106739 | A1 * | 6/2018 | E05B 55/005 |
| WO | 2018151698 | A1 | 8/2018 | |

* cited by examiner

AUXILIARY TRIM LOCKING MODULE

TECHNICAL FIELD

The present disclosure generally relates to door handle, and more particularly but not exclusively relates to systems and methods for retrofitting existing door handles.

BACKGROUND

It is occasionally desirable to discourage or prevent certain users (e.g., young children) from operating a door handle, while permitting other users (e.g., adults) to operate the handle. While there exist certain existing solutions for these circumstances, it has been found that these solutions suffer from various drawbacks and limitations. For example, one approach is to fit a rotatable shell over a knob such that rotation of the shell (e.g., by a child) does not rotate the knob. However, this approach is typically not aesthetically pleasing. Additionally, while such shells are able to be used with circular knobs on which the shell can freely spin, this solution is not amenable to use with levers. While other existing approaches integrate the selective prevention feature into the functionality of the handle assembly itself, these approaches typically have no mechanism by which the selective prevention feature can be disabled. As such, the user must always operate the selective prevention feature in order to rotate the handle, and must replace the handle assembly in the event that the selective prevention feature is no longer desired. For these reasons among others, there remains a need for further improvements in this technological field.

SUMMARY

An exemplary auxiliary trim locking module is configured for use with a handle including a shank. The handle is mounted for rotation relative to a rose having an aperture defined therein. The auxiliary trim locking module includes a collar defining an opening sized and shaped to receive the shank, a blocking member movably mounted to the collar for movement between a proximal position and a distal position, and a biasing mechanism urging the locking member toward the distal position. The blocking member includes a projection sized and shaped to be received in the aperture, and an arm operable to be manually engaged by a user to shift the blocking member between a proximal position and a distal position. Further embodiments, forms, features, and aspects of the present application shall become apparent from the description and figures provided herewith.

DETAILED DESCRIPTION OF ILLUSTRATIVE EMBODIMENTS

Figure 1:
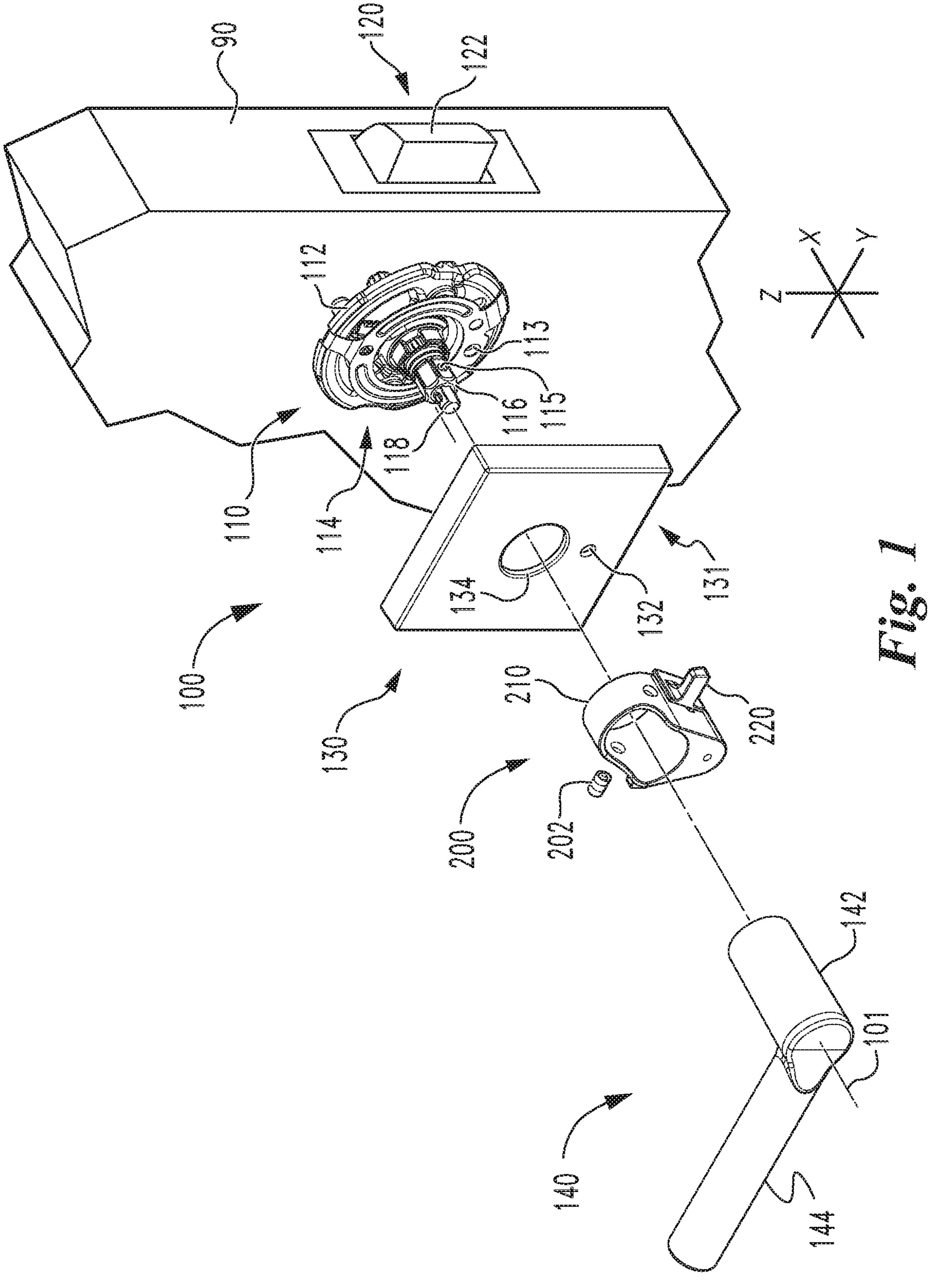
FIG. 1 is an exploded assembly view of a lockset including an auxiliary trim locking module according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 2:
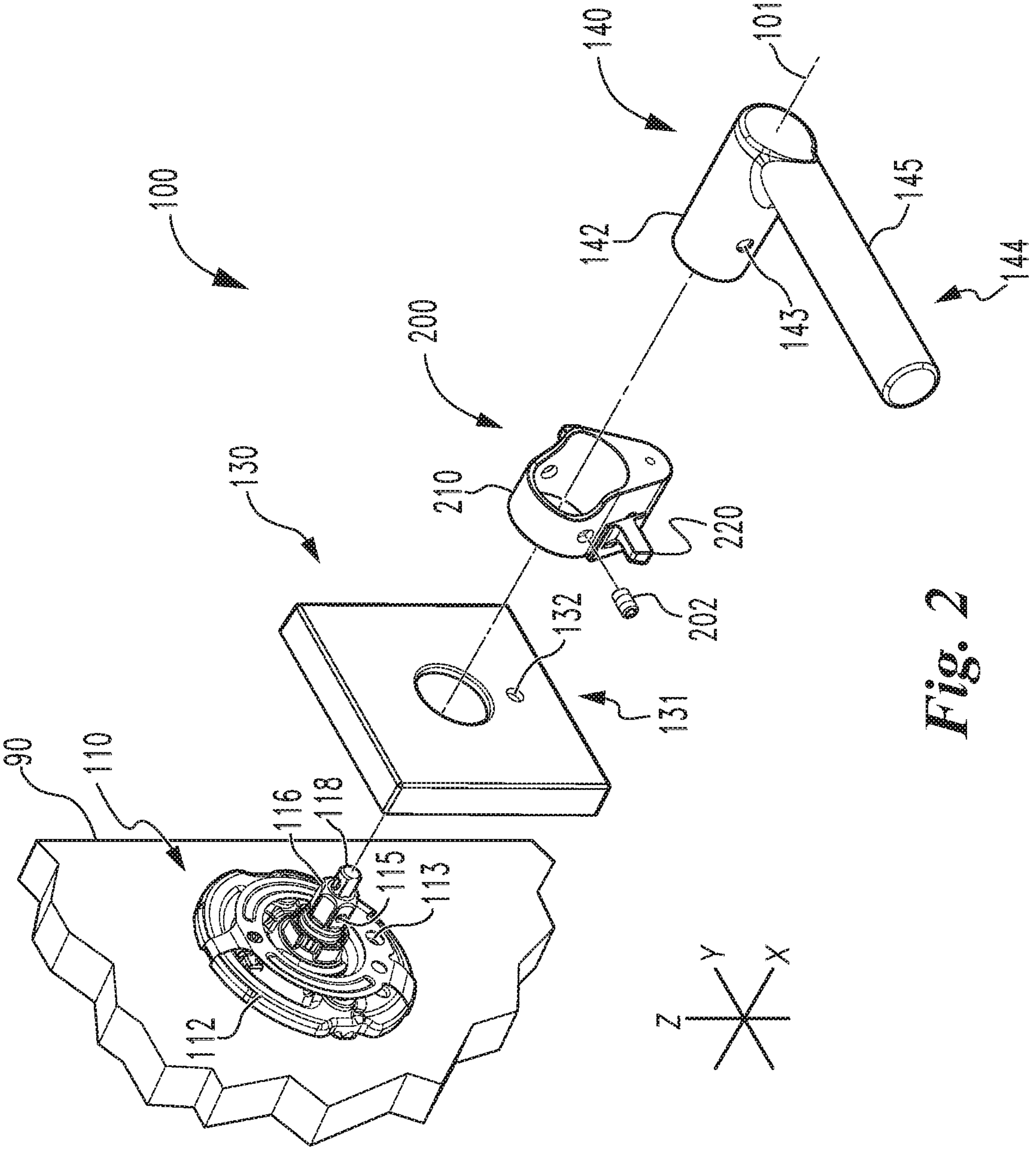
FIG. 2 is another exploded assembly view of the lockset illustrated in FIG. 1

With reference to FIGS. 1 and 2, illustrated therein is a lockset 100 having installed thereon an auxiliary trim locking module 200 according to certain embodiments. The lockset 100 generally includes a trim assembly 110 mounted to one side of a door 90, a latchbolt mechanism 120 seated in a latch bore of the door 90 and operably connected with the trim assembly 110, a rose 130 covering a portion of the trim assembly 110, and a handle 140 mounted to the trim assembly 110 such that rotation of the handle 140 about a longitudinal rotational axis 101 actuates the latchbolt mechanism 120. The longitudinal axis 101 extends along and defines a proximal direction extending outward from the door 90 (to the left and downward in FIG. 1) and an opposite distal direction toward the door 90 (to the right and upward in FIG. 1). As described herein, the auxiliary trim locking module 200 is configured to selectively prevent rotation of the handle 140 to thereby prevent the handle 140 from actuating the latchbolt mechanism 120 and retracting the latchbolt 122.

While not illustrated in FIGS. 1 and 2, it is to be appreciated that the lockset 100 may further include a second trim assembly mounted to the opposite side of the door 90, along with a second rose and a second handle mounted to the second trim assembly. In such forms, the second trim assembly may operably connect the second handle to the latchbolt mechanism 120 such that the second handle is at least selectively operable to actuate the latchbolt mechanism 120. Additionally, the lockset 100 may further include a second auxiliary trim locking module installed to the second handle to selectively prevent the second handle from actuating the latchbolt mechanism 120.

The trim assembly 110 generally includes a housing 112 having a housing aperture 113, and a spindle mechanism 114 rotatably mounted to the housing 112. The spindle mechanism 114 extends along the longitudinal axis 101 and is operably coupled with the latchbolt mechanism 120 such that rotation of the spindle mechanism 114 about the rotational axis 101 actuates the latchbolt mechanism 120. In the illustrated form, the spindle mechanism 114 includes a support spindle 116 that supports the handle 140 and a drive spindle 118 that operably connects the handle 140 with the latchbolt mechanism 120. In other embodiments, the spindle mechanism 114 may include a single spindle that both supports the handle 140 and operably couples the handle 140 with the latchbolt mechanism 120. The spindle mechanism 114 includes a pair of spindle apertures 115, which in the illustrated form are defined by the support spindle 116. As described herein, the spindle apertures 115 facilitate coupling of the handle 140 with the spindle 114 via a fastener 202. In certain embodiments, the trim assembly 110 may be considered to include the rose 130.

The latchbolt mechanism 120 includes a latchbolt 122 having an extended position and a retracted position. The latchbolt 122 may be biased toward the extended position, and is operably engaged with the spindle mechanism 114 such that rotation of the spindle 114 drives the latchbolt 122 between its extended and retracted positions. Such engagement between a latchbolt mechanism and a spindle is known in the art, and need not be described in further detail herein.

The rose 130 is mounted to the housing 112 such that the spindle mechanism 114 extends through an opening 134 of the rose 130. The rose 130 also includes a first engagement feature 131 that, as described herein, is operable to engage a corresponding second engagement feature of the locking module 200. In the illustrated form, the first engagement feature 131 is provided in the form of a rose aperture 132 that is aligned with the housing aperture 113. In other embodiments, the first engagement feature may be provided in another form, such as that of a projection. In certain embodiments, the rose 130 may be considered to constitute a portion of the trim assembly 110.

The handle 140 includes a shank portion 142 extending along the longitudinal axis 101 and a manually-graspable portion 144 extending outward from the shank portion 142. Formed within the shank portion 142 is a shank aperture 143 that facilitates coupling of the handle 140 with the spindle 114 and the locking module 200. In the illustrated form, the handle 140 is provided as a lever handle, in which the manually-graspable portion 144 is provided in the form of a lever portion 145. In other embodiments, the handle 140 may be provided in the form of a knob handle, in which the manually-graspable portion 144 is provided in the form of a knob.

The handle 140 is rotatable about the longitudinal axis 101 between a home position and a rotated position, and the spindle mechanism 114 actuates the latchbolt mechanism 120 in response to rotation of the handle 140 from the home position to the rotated position. The trim assembly 110 may include a biasing mechanism acting on the spindle mechanism 114 to bias the handle 140 toward its home position. As described herein, the auxiliary trim locking module 200 is operable to selectively prevent rotation of the handle 140 from the home position.

Figure 3:
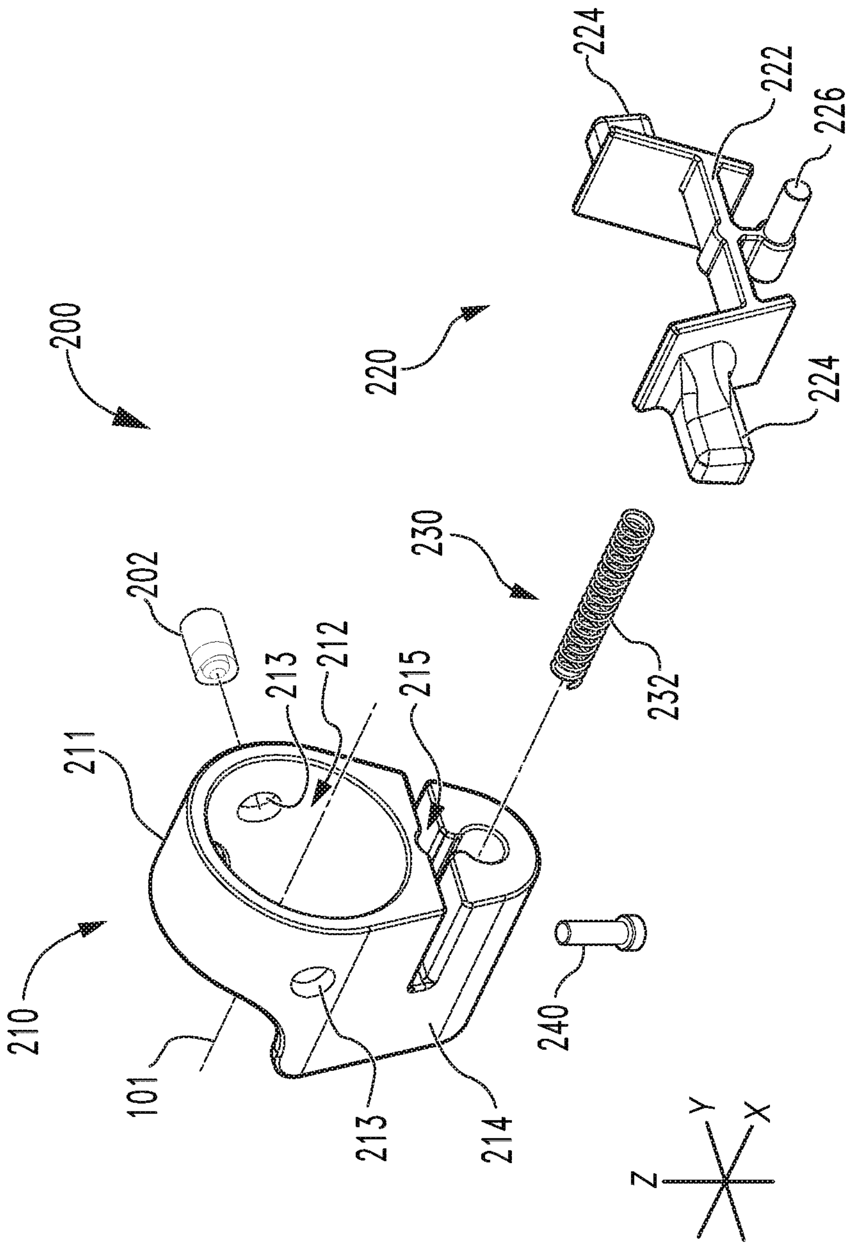
FIG. 3 is an exploded assembly view of the auxiliary trim locking module.

With additional reference to FIG. 3, the auxiliary trim locking module 200 generally includes a collar 210 mounted to the shank portion 142, a blocking member 220 movably mounted to the collar 210 for movement between a proximal unblocking position and a distal blocking position, and a biasing mechanism 230 engaged between the collar 210 and the blocking member 220 such that the biasing mechanism 230 urges the blocking member 220 toward the distal blocking position. The locking module 200 may also include the fastener 202, and may further include a retainer 240 operable to selectively retain the blocking member 220 in the proximal unblocking position.

The illustrated collar 210 includes a generally annular portion 211 defining a main opening 212 sized and shaped to receive the shank portion 142, and further includes a body portion 214 extending from one side of (e.g., downward from) the generally annular portion 211. The main opening 212 is formed about the longitudinal axis 101, and is connected with a pair of radially-extending collar apertures 213 formed on opposite sides of the longitudinal axis 101. As described herein, each of the collar apertures 213 is operable to receive the fastener 202 to couple the collar 210 with the shank portion 142. The cross-section of the main opening 212 is sized and shaped to conform to the outer cross-section of the shank portion 142. While the cross-sections of the opening 212 and the shank 142 in the illustrated embodiment are generally circular about the longitudinal axis 101, it is also contemplated that other (e.g., non-circular) geometries may be utilized. The body portion 214 defines a cavity 215 sized and shaped to receive the blocking member 220, which is seated in the cavity 215.

The blocking member 220 is slidingly mounted in the cavity 215, and generally includes a body portion 222 sized and shaped to be received in the cavity 215, a pair of arms 224 extending laterally from opposite sides of the body portion 222, and a longitudinal projection 226 extending distally from the body portion 222. The arms 224 are sized and shaped to be engaged by a user's fingers to facilitate movement of the blocking member 220 from its blocking position to its unblocking position against the urging of the biasing mechanism 230. The projection 226 is sized and shaped to be received in the rose aperture 132 and the housing aperture 113, and is one embodiment of a second engagement member operable to engage the first engagement member.

The biasing mechanism 230 is engaged between the collar 210 and the blocking member 220, and biases the blocking member 220 toward its blocking position, which in the illustrated embodiment is a distal position. In the illustrated form, the biasing mechanism 230 is provided in the form of a compression spring 232 that is seated in the cavity 215. In other forms, the biasing mechanism 230 may take another form, such as a form including one or more of a torsion spring, an extension spring, a leaf spring, an elastic member, or magnets.

Figure 4:
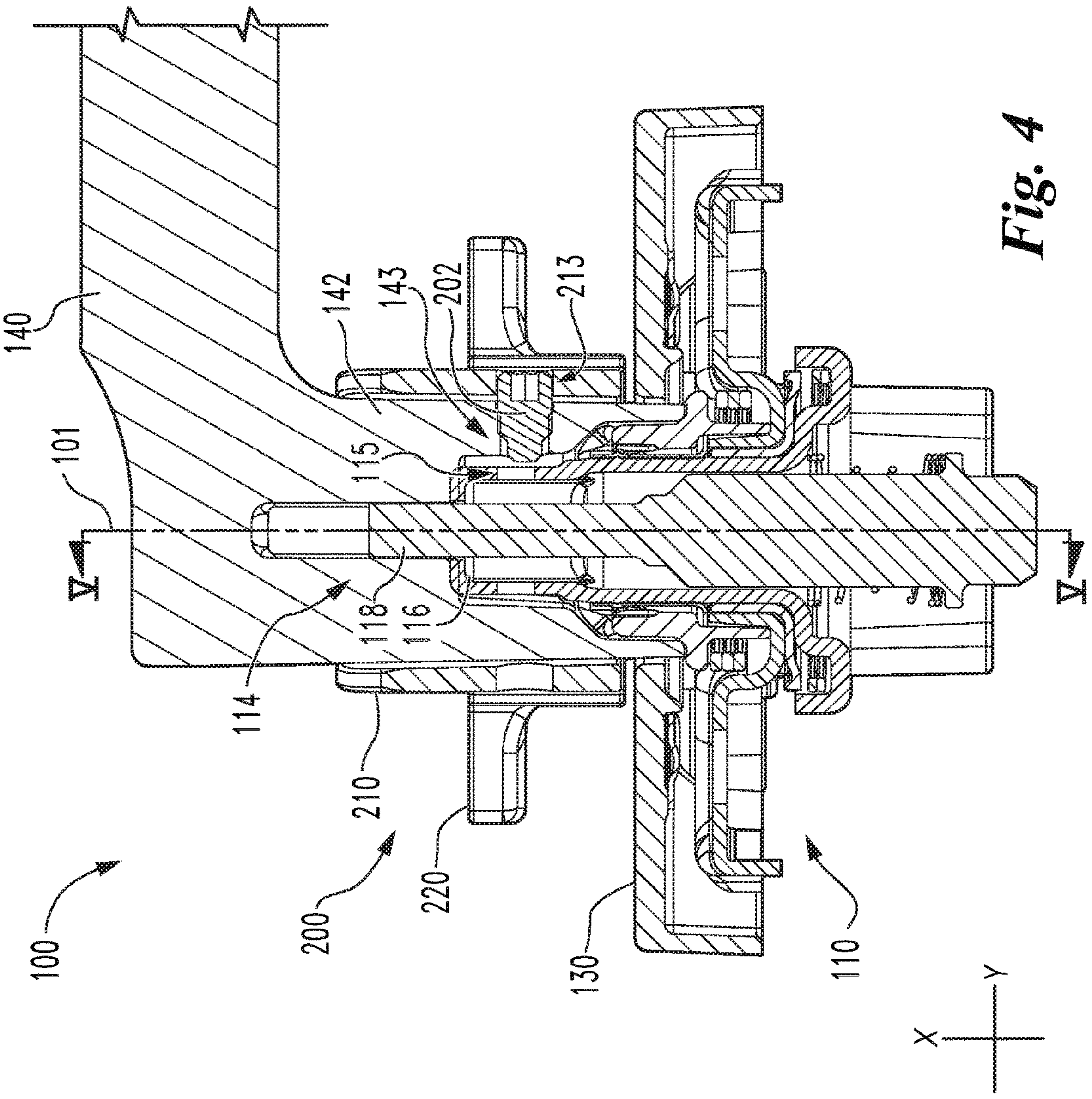
FIG. 4 is a cross-sectional view of the lockset taken along the line IV-IV in FIG. 5.

With additional reference to FIG. 4, the collar 210 is secured to the handle 140 by the fastener 202, which in the illustrated form is provided in the form of a set screw. The fastener 202 extends into the shank aperture 143 via one of the collar apertures 213, thereby rotationally and longitudinally coupling the collar 210 with the shank portion 142. The fastener 202 may further extend into one of the spindle apertures 115 to thereby longitudinally couple the shank portion 142 with the support spindle 116.

In the illustrated form, the collar 210 is rotationally and longitudinally coupled with the shank portion 142 by the fastener 202. It is also contemplated that the collar 210 may be rotationally and longitudinally coupled with the shank portion 142 by other features. For example, the longitudinal length of the collar 210 may correspond to the length of the shank portion 142 such that the collar is longitudinally captured between the manually graspable portion 144 and the rose 130. Additionally or alternatively, the shank portion 142 and the main opening 212 may have non-circular cross-sections such that the mating geometries rotationally couple the shank portion 142 with the collar 210.

The handle 140 is operable to be mounted to the spindle 114 in each of two orientations. In the first orientation, the lever portion 145 extends from the rotational axis 101 in a first lateral direction (e.g., leftward), and the fastener 202 extends through the shank aperture 143 and into a first of the spindle apertures 115 (e.g., the left-side spindle aperture 115). In the second orientation, the lever portion 145 extends from the rotational axis 101 in a second lateral direction (e.g., rightward), and the fastener 202 extends through the shank aperture 143 and into a second of the spindle apertures 115 (e.g., the right-side spindle aperture 115). Thus, the handle 140 is operable to be mounted to the trim assembly 110 in each of two orientations. In the illustrated form, the two orientations are provided as a right-hand orientation and a left-hand orientation, which are angularly offset from one another by 180° about the rotational axis 101. It is also contemplated that other orientations may be utilized, and that such orientations may be angularly offset from one another by angles other than 180°.

While other forms are contemplated, the illustrated auxiliary trim locking module 200 is configured to be mounted in a single orientation relative to the rose 130. More particularly, the locking module 200 is configured to be mounted in the orientation in which the longitudinally-movable blocking member 220 is operable to enter the rose aperture 132 when the handle 140 is in its home position. In order to maintain this orientation while accommodating mounting of the handle 140 in its two different orientations, the collar 210 includes a pair of the collar apertures 213, which are angularly spaced about the longitudinal axis 101 by an angle corresponding to the offset angle between the first and second orientations of the handle 140. In the illustrated form, the collar apertures 213 are spaced apart from one another 180° about the rotational axis 101 such that the apertures 213 are positioned diametrically opposite one another. In other forms, the collar apertures 213 may be angularly spaced by another offset angle. When the handle 140 is mounted to the trim assembly 110 in the first orientation, the fastener 202 extends into the shank aperture 143 via one of the collar apertures 213. When the handle 140 is mounted to the trim assembly 110 in the second orientation, the fastener 202 extends into the shank aperture 143 via the other of the collar apertures 213.

Figure 5:
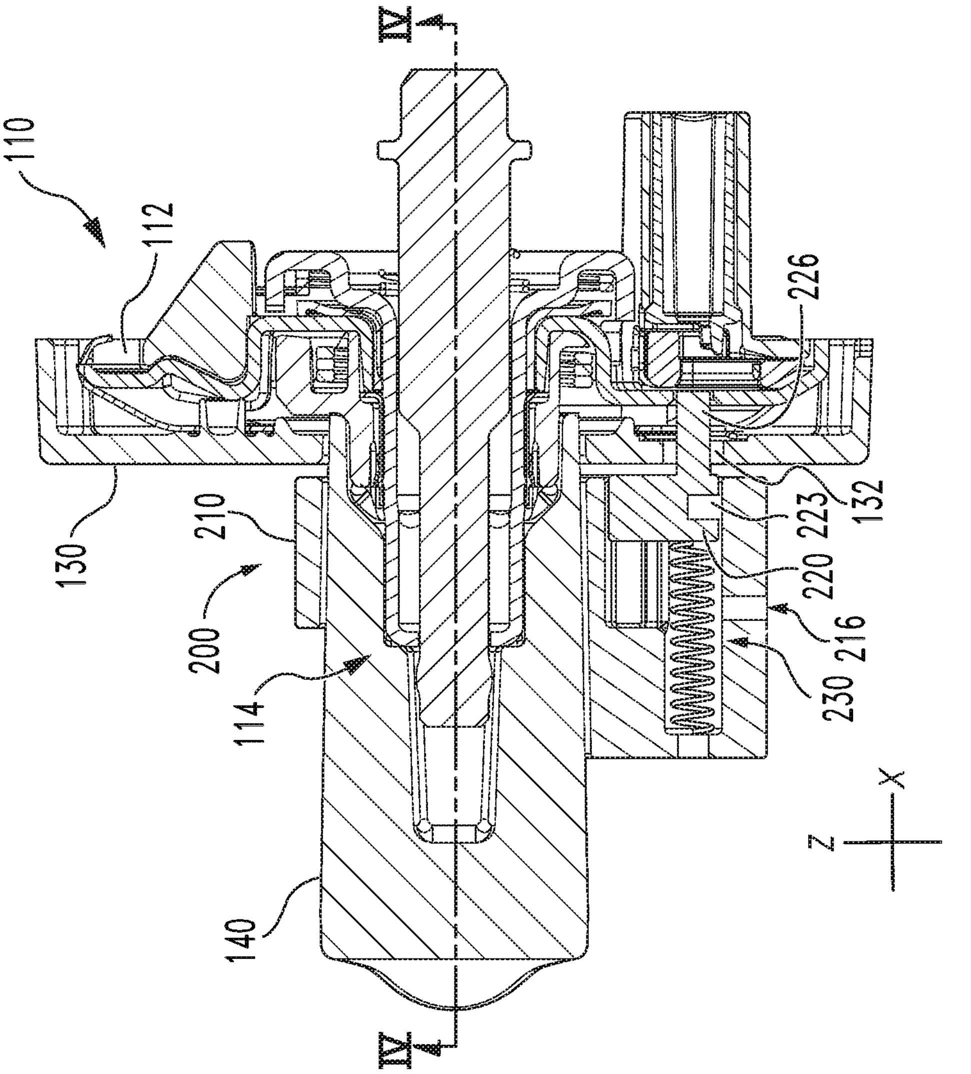
FIG. 5 is a cross-sectional view of the lockset taken along the line V-V in FIG. 4, and illustrates the auxiliary trim locking module in a blocking state.
Figure 6:
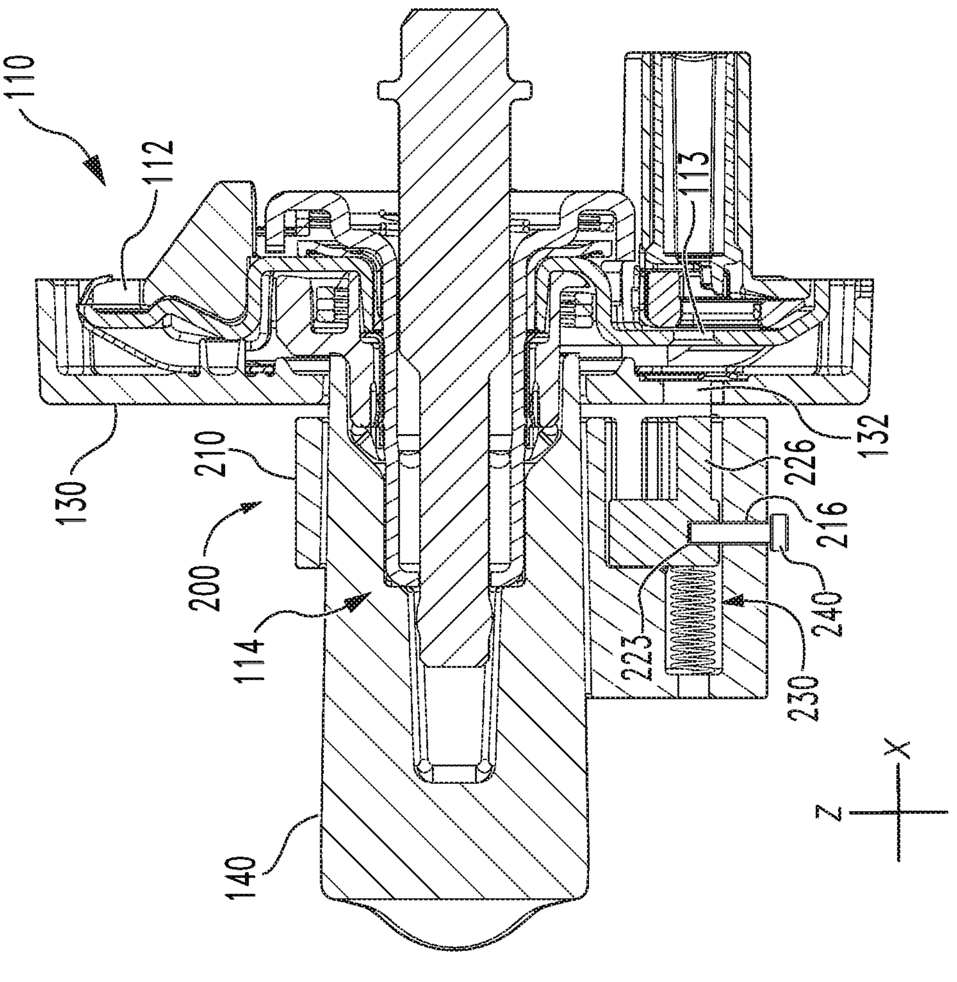
FIG. 6 is a cross-sectional view of the lockset taken along the line V-V in FIG. 4, and illustrates the auxiliary trim locking module in an unblocking state.

With additional reference to FIGS. 5 and 6, the illustrated blocking member 220 is mounted for linear movement between a blocking position (FIG. 5) and an unblocking position (FIG. 6), and is biased toward the blocking position by the biasing mechanism 230. The blocking member 220 is capable of being manually moved from the blocking position to the unblocking position against the force of the biasing mechanism 230, for example by a user exerting a proximal pushing force on one or both of the arms 224.

With the blocking member 220 in the blocking position (FIG. 5), the projection 226 extends into the housing apertures 113 via the rose aperture 132 such that the blocking member 220 prevents rotation of the collar 210 about the rotational axis 101. With the collar 210 and the handle 140 rotationally coupled by the fastener 202, rotation of the handle 140 from its home position is thereby prevented. As a result, when the blocking member 220 is in its blocking position, the auxiliary trim locking module 200 prevents the handle 140 from rotating the spindle mechanism 114 and actuating the latchbolt mechanism 120. Stated another way, the auxiliary trim locking module 200 prevents rotation of the handle 140, thereby locking the lockset 100.

With the blocking member 220 in the unblocking position (FIG. 6), the projection 226 is removed from the apertures 113, 132 such that rotation of the handle 140 is not prevented by the auxiliary trim locking module 200. As a result, the locking module 200 does not prevent the handle 140 from actuating the latchbolt mechanism 120, and the user may be able to rotate the handle 140 to actuate the latchbolt mechanism 120. After the handle 140 is rotated from its home position to its rotated position, the user may release the blocking member 220 before allowing the handle 140 to return to its home position. In such an event, the projection 226 will travel along the face of the rose 130 until becoming aligned with the rose aperture 132, at which point the biasing mechanism 230 will return the blocking member 220 to its blocking position, thereby once again locking the handle 140 against rotation.

It should be appreciated that a certain amount of manual dexterity and knowledge regarding the proper operation of the auxiliary trim locking module 200 may be required to move the blocking member 220 to its unblocking position to thereby enable rotation of the handle 140. These requirements will hinder certain users (e.g., small children) from operating the lockset 100, without presenting a significant obstacle to the operation of the lockset 100 by other users (e.g., adults).

As noted above, the auxiliary trim locking module 200 does not prevent the handle 140 from actuating the latchbolt mechanism 120 when the blocking member 220 is in its unblocking position. It should be appreciated, however, that the handle 140 may nonetheless be prevented from actuating the latchbolt mechanism 120. For example, in the event that the handle 140 is provided as an outside handle and the lockset 100 includes a primary locking mechanism, the handle 140 may be prevented from actuating the latchbolt mechanism 120 when the primary locking mechanism is in its locking state.

In the illustrated form, the auxiliary trim locking module 200 includes a retainer 240 operable to selectively retain the blocking member 220 in the unblocking position against the urging of the biasing mechanism 230. While other forms are contemplated, the illustrated retainer 240 is provided in the form of a pin, and the collar 210 and the blocking member 220 include apertures 216, 223 operable to receive the pin. When the blocking member 220 is in its blocking position (FIG. 6), the apertures 216, 223 are aligned such that the retainer 240 can be inserted into the apertures 216, 223 to retain the blocking member 220 in its blocking position. With the retainer 240 so inserted, the auxiliary locking functionality provided by the locking module 200 is disabled. As a result, the handle 140 can be rotated without actuating the auxiliary trim locking module 200.

In the illustrated form, the mating engagement features of the rose 130 and the blocking member 220 are provided in the form of a rose aperture 132 and a projection 226 of the blocking member 220. It is also contemplated that these features may be reversed such that the rose 130 includes a projection and the blocking member 220 includes an aperture sized and shaped to receive the projection. Additionally, while the illustrated blocking member 220 is mounted for longitudinal movement between its blocking and unblocking positions, it is also contemplated that the blocking member 220 may move between a blocking position and an unblocking position in another manner, such as by lateral movement or rotational movement.

Figure 7:
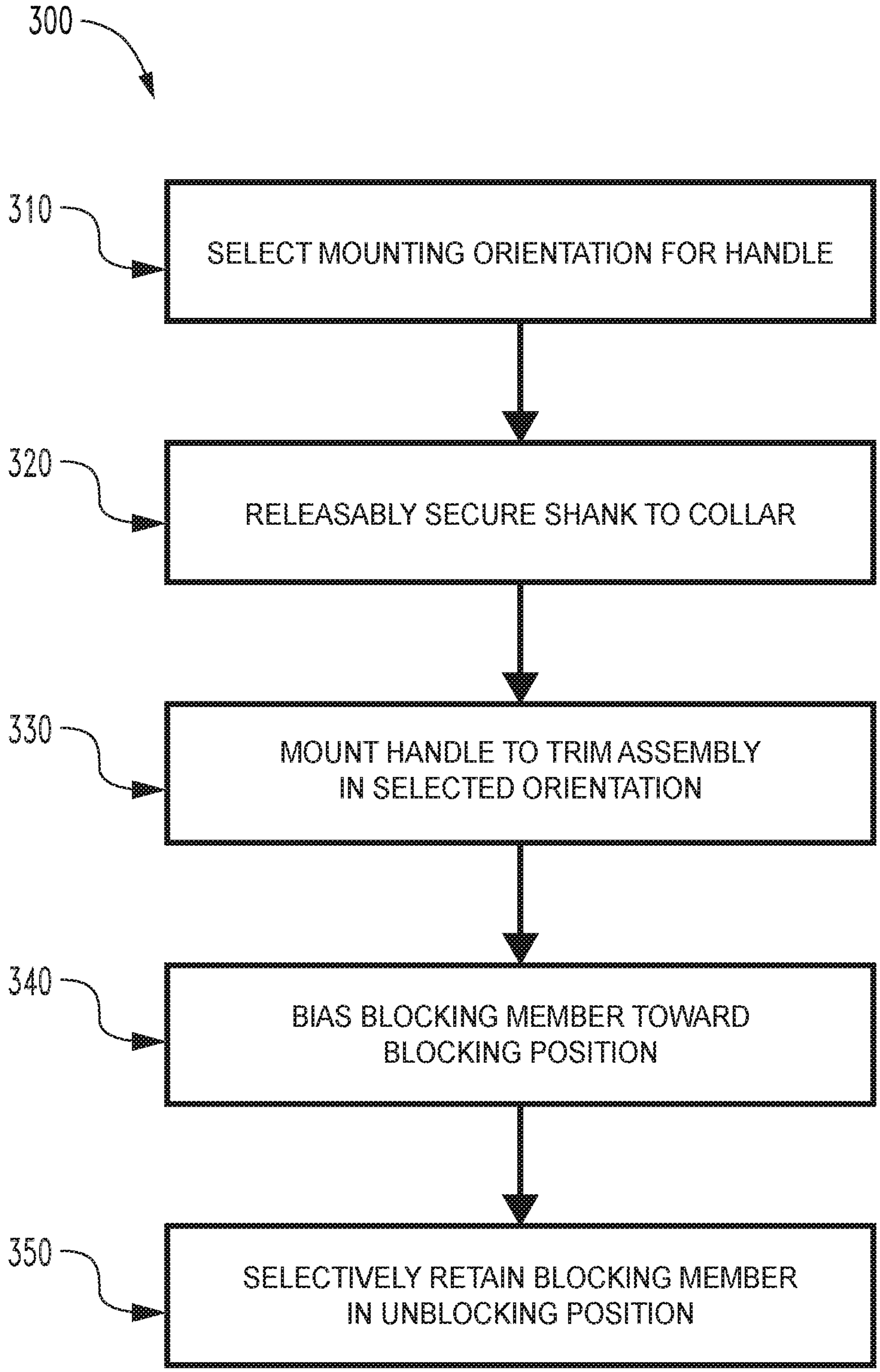
FIG. 7 is a schematic flow diagram of a process according to certain embodiments.

With additional reference to FIG. 7, illustrated therein is a process 300 according to certain embodiments. Blocks illustrated for the processes in the present application are understood to be examples only, and blocks may be combined or divided, and added or removed, as well as reordered in whole or in part, unless explicitly stated to the contrary. While the blocks are illustrated in a relatively serial fashion, it is to be understood that two or more of the blocks may be performed concurrently or in parallel with one another.

The process 300 may include block 310, which generally involves selecting an orientation for the handle 140. The process 300 may, for example, include block 310 in embodiments in which the handle 140 is provided as a lever handle. In certain embodiments, such as those in which the handle 140 is provided as a knob handle, block 310 may be omitted. In the illustrated form, block 310 involves selecting the orientation from a right-hand orientation in which the lever portion 145 extends primarily rightward from the rotational axis 101 and a left-hand orientation in which the lever portion 145 extends primarily leftward from the rotational axis 101.

The process 300 generally includes block 320, which involves releasably securing the shank portion 142 to the collar 210. Block 320 may, for example, involve inserting the shank portion 142 into the main collar opening 212 such that the shank aperture 143 is aligned with the collar aperture 213 corresponding to the selected orientation. Block 320 may further include inserting the fastener 202 into the shank aperture 143 via the aligned collar aperture 213 to thereby rotationally and longitudinally couple the shank portion 142 and the collar 210.

The process 300 also includes block 330, which generally includes mounting the handle 140 to the trim assembly 110, for example in the selected orientation. Block 330 may involve inserting the spindle mechanism 114 into a cavity formed in the shank portion 142 such that the shank aperture 143 aligns with the spindle aperture 115 corresponding to the selected orientation. Block 330 may further involve advancing the fastener 202 such that the fastener 202 extends into the aligned spindle aperture 115, thereby longitudinally coupling the handle 140 with the support spindle 116.

The process 300 also includes block 340, which generally involves biasing the blocking member 220 toward its blocking position, for example with the biasing mechanism 230. As a result of block 340, the blocking member 220 is biased toward the blocking position, in which a first engagement member (e.g., the blocking member projection 226) is engaged with a second engagement member (e.g., the rose aperture 132 and/or the housing aperture 113) to thereby prevent rotation of the handle 140. As will be appreciated, the blocking member 220 is operable to be moved against this biasing force to the unblocking position, in which the engagement members are disengaged from one another and rotation of the handle 140 is not prevented by the auxiliary trim locking module 200.

The process 300 may further include block 350, which generally involves selectively retaining the blocking member 220 in its unblocking position. Block 350 may, for example, involve moving the blocking member 220 to its unblocking position and inserting the retainer 240 into the aligned apertures 216, 223 to thereby retain the blocking member 220 in its unblocking position. It is also contemplated that block 350 may be omitted, for example in embodiments that do not include the retainer 240.

In certain embodiments, the auxiliary trim locking module 200 may be provided as a retrofit kit for the lockset 100, for example in embodiments configured for use with a lockset 100 that includes a rose 130 having an appropriate engagement features (e.g., the rose aperture 132 and/or the housing aperture 113). In certain embodiments, the retrofit kit may further include the rose 130, for example in embodiments configured for use with a lockset that does not include a rose 130 having the appropriate engagement feature (e.g., the rose aperture 132). A retrofit kit may further include the fastener 202, which may have a length greater than the length of the fastener included with the lockset 100 at the time of sale. It is also contemplated that the auxiliary trim locking module 200 may be sold with the lockset 100 as a system in which the locking module 200 is operable to be selectively installed to the lockset 100.

As will be appreciated, the auxiliary trim locking module 200 can be installed to and uninstalled from the lockset 100 as desired to selectively provide the lockset 100 with child-resistant characteristics. In certain forms, such as those that include the above-described retainer 240, the child-resistant characteristics may be selectively disabled without removing the auxiliary trim locking module 200 from the lockset 100.

While the illustrated auxiliary locking module is provided in the form of an auxiliary trim locking module 200 configured for use with a trim of a lockset 100, it is to be appreciated that a trim locking module along the lines set forth above may be utilized in combination with other devices. In certain embodiments, an auxiliary locking module may be provided to a device in which a rotatable input (e.g., a knob, a lever, or another form of a handle) is used to actuate the device in one manner or another, particularly in embodiments in which it may be desirable to prevent the device from being operated by children. By way of illustration, an auxiliary locking module along the lines set forth above may be installed to or configured for use with a knob that controls operation of an oven or stove, or a knob or lever that controls the flowrate and/or temperature of water from a faucet.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset, comprising:
- an outer rose having an aperture defined therein;
- a handle mounted for rotation relative to the rose, the handle including a shank;
- a collar including an annular ring defining an opening sized and shaped to receive the shank with the collar rotationally and longitudinally coupled to the shank, the collar extending along a longitudinal axis defining a proximal direction and an opposite distal direction;
- a blocking member movably mounted to the collar for movement between a blocking position and an unblocking position, the blocking member including:
  - a projection sized and shaped to be received in the aperture of the rose to prevent rotation of the handle relative to the rose; and
  - an arm operable to be manually engaged by a user to shift the blocking member between a proximal position and a distal position; and
- a biasing mechanism urging the blocking member toward the distal position;
- wherein the projection of the blocking member is selectively received in the aperture of the rose when the blocking member is in the blocking position to prevent rotation of the handle relative to the rose; and
- wherein the projection of the blocking member is selectively removed from the aperture of the rose when the blocking member is in the unblocking position to permit rotation of the handle relative to the rose.

2. The lockset of claim 1, further comprising a fastener engaged with the collar and the shank to rotationally and longitudinally couple the collar to the shank.

3. The lockset of claim 1, further comprising a retainer operable to selectively retain the blocking member in the proximal position.

4. The lockset of claim 1, wherein the blocking member further comprises:
- a body portion engaged with the biasing mechanism, wherein the projection extends from the body portion in the distal direction, and wherein the arm extends from the body portion in a first lateral direction; and
- a second arm extending from the body portion in a second lateral direction opposite the first lateral direction.

5. The lockset claim 1, further comprising a fastener;
- wherein the collar includes a first radial aperture and a second radial aperture positioned diametrically opposite the first radial aperture; and
- wherein the fastener is operable to be selectively placed in each of the first radial aperture and the second radial aperture to secure the collar to the shank.

6. A method, comprising:
- inserting a shank of a handle into an opening formed by a collar, wherein a blocking member is movably mounted to the collar, and wherein the blocking member includes a first engagement feature;
- releasably securing the collar to the shank, wherein releasably securing the collar to the shank comprises:
  - aligning a collar aperture formed in the collar with a shank aperture formed in the shank; and
  - inserting a fastener into the shank aperture via the collar aperture such that the fastener extends between the collar aperture and the shank aperture;
- mounting the handle to a trim assembly comprising a rose including a second engagement feature operable to engage the first engagement feature; and
- biasing the blocking member toward a blocking position in which the first engagement feature is engaged with the second engagement feature such that the engaged engagement features prevent rotation of the handle relative to the rose; and
- wherein the blocking member is movable to an unblocking position in which the first engagement feature and the second engagement feature are disengaged such that the disengaged engagement features do not prevent rotation of the handle relative to the rose.

7. The method of claim 6, wherein the collar comprises a first aperture and a second aperture;
- wherein each of the first aperture and the second aperture is operable to be utilized as the collar aperture;
- wherein the handle comprises a lever handle including an elongated lever extending laterally from the shank;
- wherein the method further comprises selecting an orientation for the lever handle;
- wherein mounting the handle to the lockset comprises mounting the lever handle to the lockset in the selected orientation;
- wherein when the selected orientation is a first orientation, the first aperture is utilized as the collar aperture; and wherein when the selected orientation is a second orientation, the second aperture is utilized as the collar aperture.

8. The method of claim 7, wherein the first aperture and the second aperture are positioned diametrically opposite one another; and wherein first orientation and the second orientation are angularly offset from one another by 180° about a rotational axis defined by the shank.

9. The method of claim 6, wherein the collar comprises a first aperture and a second aperture;

wherein the method further comprises selecting an orientation for the handle from a first orientation in which the first aperture is aligned with the shank aperture and a second orientation in which the second aperture is aligned with the shank aperture; and wherein releasably securing the collar to the shank comprises inserting the fastener into the shank aperture via the one of the first aperture or the second aperture that is aligned with the shank aperture.

10. The method of claim 6, wherein the trim assembly further comprises a spindle mechanism mounted for rotation relative to the rose; and wherein releasably securing the collar to the shank comprises extending a removable fastener into a spindle aperture formed in the spindle mechanism via a collar aperture formed in the collar and a shank aperture formed in the shank.

11. A system, comprising:

a lockset comprising:

a rose including a first engagement feature;

a spindle mounted for rotation relative to the rose, wherein the spindle is rotatable about a longitudinal axis; and a handle rotationally coupled with the spindle, the handle including a shank extending along the longitudinal axis; and a trim locking module releasably mounted to the lockset, the trim locking module comprising:

a collar including an annular ring defining an opening through which the shank extends, wherein the collar is releasably secured to the shank such that the collar is rotationally and longitudinally coupled to the shank to prevent rotational and longitudinal movement therebetween;

a blocking member include a second engagement feature operable to engage the first engagement feature, wherein the blocking member is movably mounted to the collar for movement between a blocking position and an unblocking position; and a biasing mechanism urging the blocking member toward the blocking position;

wherein the blocking member is mounted to the collar for longitudinal movement between the blocking position and the unblocking position;

wherein, with the blocking member in the blocking position, the first engagement feature and the second engagement feature are engaged with one another and prevent rotation of the handle relative to the rose; and wherein, with the blocking member in the unblocking position, the first engagement feature and the second engagement feature are disengaged from one another and do not prevent rotation of the handle relative to the rose.

12. The system of claim 11, wherein one of the first engagement feature or the second engagement feature comprises a projection, and wherein the other of the first engagement feature or the second engagement feature comprises an aperture sized and shaped to receive the projection.

13. The system of claim 11, further comprising a fastener releasably securing the collar to the shank, the fastener extending through a first collar aperture formed in the collar and into a shank aperture formed in the shank.

14. The system of claim 13, wherein the collar further includes a second collar aperture;

wherein the lockset has a first configuration in which the handle is mounted to the spindle in a first orientation and the fastener extends into the shank aperture via the first collar aperture; and wherein the lockset has a second configuration in which the handle is mounted to the spindle in a second orientation and the fastener extends into the shank aperture via the second collar aperture.

15. The system of claim 14, wherein the first collar aperture and the second collar aperture are positioned diametrically opposite one another.

16. The system of claim 11, wherein the collar circumferentially surrounds the shank.

17. A system, comprising:

a lockset comprising:

a rose including a first engagement feature;

a spindle mounted for rotation relative to the rose, wherein the spindle is rotatable about a longitudinal axis; and a handle rotationally coupled with the spindle, the handle including a shank extending along the longitudinal axis; and a trim locking module releasably mounted to the lockset, the trim locking module comprising:

a collar including an annular ring defining an opening through which the shank extends, wherein the collar is releasably secured to the shank such that the collar is rotationally and longitudinally coupled to the shank to prevent rotational and longitudinal movement therebetween;

a blocking member include a second engagement feature operable to engage the first engagement feature, wherein the blocking member is movably mounted to the collar for movement between a blocking position and an unblocking position; and a biasing mechanism urging the blocking member toward the blocking position;

wherein, with the blocking member in the blocking position, the first engagement feature and the second engagement feature are engaged with one another and prevent rotation of the handle relative to the rose;

wherein, with the blocking member in the unblocking position, the first engagement feature and the second engagement feature are disengaged from one another and do not prevent rotation of the handle relative to the rose;

wherein the collar includes a collar aperture, the shank includes a shank aperture, and the spindle comprises a spindle aperture; and wherein a removable fastener extends between the collar aperture, the shank aperture, and the spindle aperture such that the removable fastener releasably couples the shank with the collar and the spindle.

18. The lockset of claim 1, wherein the collar and the blocking member are positioned external to the rose.

19. The lockset of claim 2, wherein the fastener extends through aligned apertures in the collar the shank to secure the collar to the shank.

20. A system, comprising:

a lockset comprising:

a rose including a first engagement feature, wherein the rose has an outer surface, and wherein the first engagement feature is located on the outer surface of the rose;

a spindle mounted for rotation relative to the rose, wherein the spindle is rotatable about a longitudinal axis; and a handle rotationally coupled with the spindle, the handle including a shank extending along the longitudinal axis; and a trim locking module releasably mounted to the lockset, the trim locking module comprising:

a collar including an annular ring defining an opening through which the shank extends, wherein the collar is releasably secured to the shank such that the collar is rotationally and longitudinally coupled to the shank to prevent rotational and longitudinal movement therebetween;

a blocking member include a second engagement feature operable to engage the first engagement feature, wherein the blocking member is movably mounted to the collar for movement between a blocking position and an unblocking position; and a biasing mechanism urging the blocking member toward the blocking position;

wherein, with the blocking member in the blocking position, the first engagement feature and the second engagement feature are engaged with one another and prevent rotation of the handle relative to the rose; and wherein, with the blocking member in the unblocking position, the first engagement feature and the second engagement feature are disengaged from one another and do not prevent rotation of the handle relative to the rose.

21. A system, comprising:

a lockset comprising:

a rose including a first engagement feature;

a spindle mounted for rotation relative to the rose, wherein the spindle is rotatable about a longitudinal axis; and a handle rotationally coupled with the spindle, the handle including a shank extending along the longitudinal axis; and a trim locking module releasably mounted to the lockset, the trim locking module comprising:

a collar including an annular ring defining an opening through which the shank extends, wherein the collar is releasably secured to the shank such that the collar is rotationally and longitudinally coupled to the shank to prevent rotational and longitudinal movement therebetween;

a blocking member include a second engagement feature operable to engage the first engagement feature, wherein the blocking member is movably mounted to the collar for movement between a blocking position and an unblocking position; and a biasing mechanism urging the blocking member toward the blocking position;

wherein the collar and the blocking member are positioned external to the rose;

wherein, with the blocking member in the blocking position, the first engagement feature and the second engagement feature are engaged with one another and prevent rotation of the handle relative to the rose; and wherein, with the blocking member in the unblocking position, the first engagement feature and the second engagement feature are disengaged from one another and do not prevent rotation of the handle relative to the rose.

22. The lockset of claim 1, wherein the blocking member is movably mounted to the collar for longitudinal movement between the blocking position and the unblocking position.

23. The lockset of claim 1, wherein the rose has an outer surface, and wherein the aperture is located on the outer surface of the rose.

* * * * *